Nov. 8, 1966   K. R. FRECHETTE   3,283,872
TABULAR STOP ASSEMBLY
Filed June 3, 1964

INVENTOR
KENNETH R. FRECHETTE

Thomas L. Ross
BY Joseph R. Spalla
ATTORNEYS

United States Patent Office 3,283,872
Patented Nov. 8, 1966

3,283,872
TABULAR STOP ASSEMBLY
Kenneth R. Frechette, Bristol, Conn., assignor, by mesne assignments, to Royal Typewriter Company, Inc., New York, N.Y., a corporation of Delaware
Filed June 3, 1964, Ser. No. 372,258
2 Claims. (Cl. 197—70)

This invention relates to motion controlling stop assemblies of the kind used, for example, with typewriting machines to control letter spacing or tabulating movement of the typewriter carriage. More particularly it relates to stop assemblies characterized by a single unit stop element construction each stop element of which is selectively movable between set and reset positions.

Prior tabular stop assemblies have been relatively complicated and presented problems of fabrication and assembly, all of which contributed to cost disadvantages. In accordance with the present invention, the stop elements comprise an inexpensively formed single unit construction adapted to be carried by stamped sheet metal mounting plates so formed as to permit the selective movement between set and reset positions of individual stop elements comprising the single unit stop element construction without resort to springs or any other additional parts to detentably hold positioned stop elements. In accordance with the invention the assembly may easily be put together by relatively unskilled labor in a facile manner.

An object of the invention is to provide an improved tabular or escapement stop assembly including a single unit stop element construction.

Another object of the invention is to provide a tabular stop assembly which is inexpensive to manufacture, assemble and maintain.

Another object of the invention is in the provision of a stop assembly of the type referred to in which the detenting means is constituted solely by the unique stop elements and stop element mount construction.

A further object of the invention is in the provision of resilient stop elements of flat spring steel stock so mounted as to permit movement to set and reset positions and in set position to present themselves edgewise to a counter-stop element to arrest carriage movement.

A still further object of the invention is in the provision of a tabular stop assembly equally suitable for association with instrumentalities movable toward the assembly to set and reset stops, or itself movable toward fixed stop setting and resetting instrumentalities.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
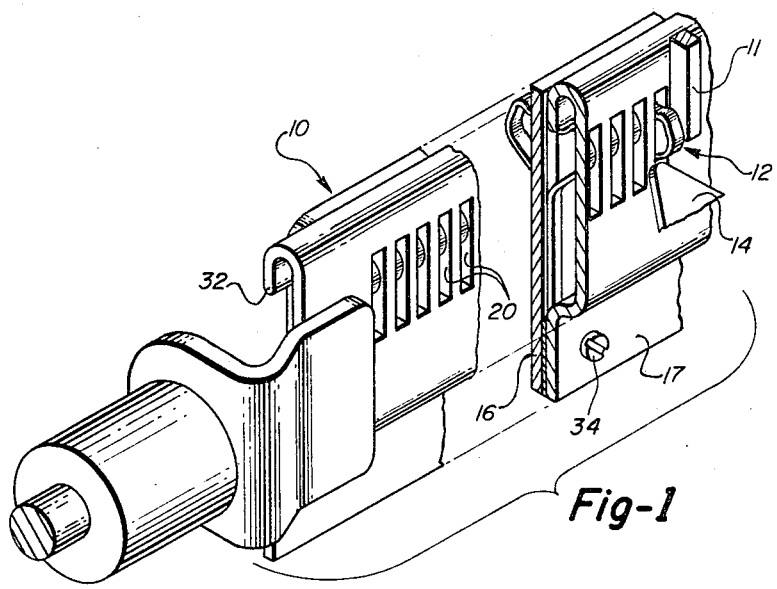
FIGURE 1 is a perspective view of a tabular stop assembly made in accordance with the present invention.
Figure 3:
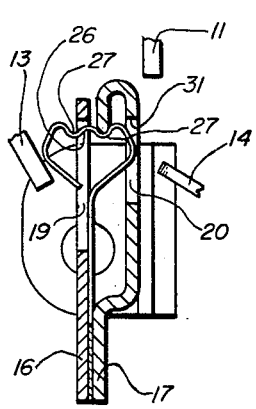
FIGURES 3–6 are views illustrating stop movement between reset and set positions.
Figure 5:
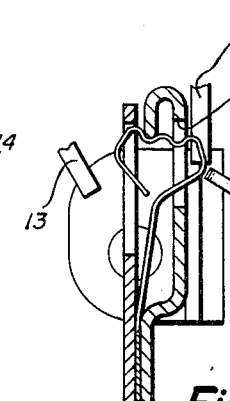

Referring now to the drawings wherein like or corresponding elements are designated with like reference characters, there is shown in FIGURE 1 a tabular stop assembly generally designated by reference numeral 10 adapted to be mounted by slidable means on a carriage (not shown) movable relative to a frame supported tab blade or counter-stop element 11 positionable from an inactive position (FIGURE 3) in response to a tabulating action to an active position (FIGURE 5) into the path of set tabular stop elements generally designated by reference numeral 12 in the assembly.

Figure 6:
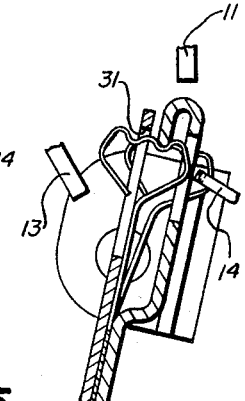

Associated with the tabular stop assembly are a tab setting element 13 and a tab stop resetting element 14. In the embodiment disclosed these elements are fixed on the machine frame and the entire tabular assembly 10 is rockable from a normal unset position (FIGURE 3) toward the setting element 13 (FIGURE 4) to set a tab stop at a particular carriage position, and from a normal set position (FIGURE 5) toward the resetting element 14 (FIGURE 6) whereby as the carriage is moved either in tabulation or carriage return the resetting element will cam all set stops to reset position.

A tabular stop assembly in accordance with the invention may also be rockably mounted on the frame in machines having a single printing element movable in carriage return and tab directions with the setting and resetting and tabular blade instrumentalities carried by the printing element carriage.

Figure 2:
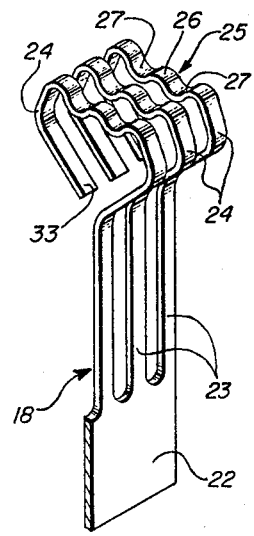
FIGURE 2 is a perspective view of a single unit stop element construction.

With more particular reference to FIGURES 1 and 2 the tabular stop assembly 10 comprises a stop mounting structure which consists of a flat elongated front plate 16 and an elongated rear plate 17 adapted to be secured along and adjacent the bottom edge to the front plate and together with the front plate to secure between them the single unit stop construction generally designated by reference 18 (FIGURE 2). Both the front and rear plates are formed with equi-spaced rectangular openings 19 and 20 respectively which are long in the vertical dimension and are aligned with one another to accommodate the individual stop elements 12 of the single unit stop element construction for lateral movement between reset and set positions.

As shown in FIGURE 2 the single unit stop element construction 18 takes the form of a spring steel comb comprising a strip 22 having teeth 23 equi-spaced at the same intervals as the openings in the stop mounting structure and of approximately the same width. The teeth 23 are bent back upon themselves thereby to form substantially heart-like shapes secured to the common strip portion of the comb-like construction and having sides 24 and a lateral top portion generally designated 25 which is crimped to form a land 26 between valleys 27.

Referring once again to FIGURES 3–6, the rear plate, a predetermined distance from the bottom edge, is offset into a vertical plane spaced a predetermined distance from the plane of the bottom portion thereby to permit movement of the individual stop elements between set and reset positions. As seen in FIGURES 3–6 the upper edges 31 of the openings 19 and 20 are coplanar but the spaced openings 20 in the rear plate 17 are shorter and rigidly support a set stop element (FIGURE 5) against movement in the direction of relative movement between assembly 10 and tab stop blade 11 when encountering the tabular stop blade 11. Further as is evident from these figures, the upper portion of the rear plate 17 is bent back on itself in the direction of the front plate to the extent that the terminal edge 32 extends parallel to and between the plates and extends a predetermined distance below the upper coplanar edges 31 of the openings 19 and 20 in the plates thereby to cooperate with the lands and valleys of the lateral portion 25 of the stop elements to detentably hold the individual stop elements in set and reset positions. It is to be noted that the free end 33 of the teeth forming the stop elements is free and permits flexure incident to detenting.

As viewed in FIGURES 3–6 the front and back plates which sandwich the resilient comb strip between them may be secured as by spot welding or by screws 34 and nuts as illustrated. The resiliency of the individually supported stop elements 12 permits their movement by associated setting and resetting control elements to detented set and reset positions.

Figure 4:
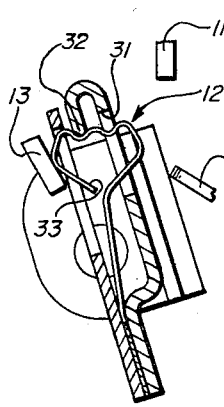

As viewed in FIGURES 1 and 4 a set stop element on the movable carriage will encounter a tab blade 11 positioned to arrest the carriage and more particularly that the edge of a set stop element encounters the tab blade thereby offering a relatively rigid stop, particularly as the greater part of the heart-shaped set stop element is within the openings 19 and 20 of and in the space between plates of the mounting structure of the assembly to provide lateral rigidity.

Figure 7:
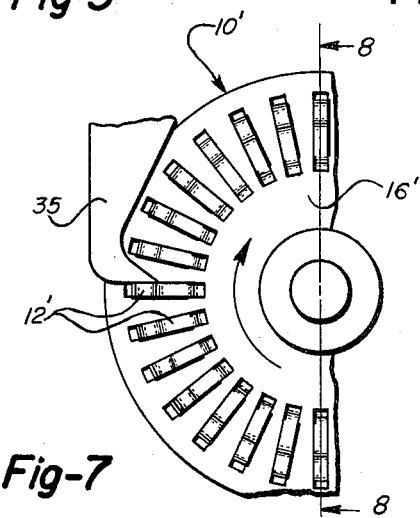
FIGURE 7 is an elevational view of an escapement wheel or circular tab rack construction made in accordance with the invention.

With reference to FIGURE 7 the invention may be utilized in the form of a circular tab rack or as an escapement wheel such as the type disclosed in Patents 3,018,870 and 3,045,798, wherein a selected number of stop elements 12' downstream of a fixed stop 35 are cancelled to accordingly permit carriage escapement a proportionate amount.

Figure 8:
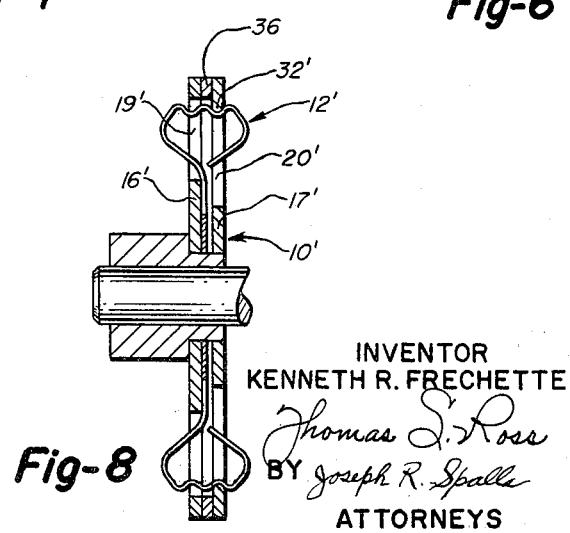
FIGURE 8 is a cross sectional view taken along lines 8—8 of FIGURE 7.

As viewed in FIGURE 8 the mounting structure 10' may comprise flat front and rear plates 16' and 17' and an annular spacer plate 36 which may be integral with either of plates 16' and 17'. As in the FIGURES 1-6 embodiment, the single stop element structure is mounted and suitably secured between plates 16' and 17' with individual stops 12' within openings 19' and 20' in the plates; the annular spacer permitting sufficient flexure between set and reset positions; the detent 32' in this embodiment being the upper edge of the opening 20' in the plate 17'.

It should be understood therefore that the foregoing disclosure relates only to preferred embodiments of the invention and that it is intended to cover all changes and modifications of the example of the invention herein chosen for the purposes of the disclosure which do not constitute departures from the spirit and scope of the invention.

The invention claimed is:
1. A tabular stop assembly comprising first and second elongated plates each having a plurality of rectangular openings spaced along its length,
an elongated strip having a plurality of spaced flexible teeth the free ends of which are bent upon themselves to form stop elements,
means for securely sandwiching said elongated strip between said elongated plates with said stop elements within said openings, said stop elements protruding from the plane of said first plate when in a set position and from the plane of said second plate when in a reset position,
and means within the openings in one of said plates cooperable with said stop elements to detentably hold said stop elements in set and reset positions.

2. A tabular stop assembly cooperable with a relatively movable stop comprising first and second plates each having a plurality of openings therein spaced at regular intervals,
a comb-like member of flexible material comprising a strip having a plurality of teeth extending therefrom spaced at intervals corresponding to the spacing intervals of and substantially coextensive in width with said plate openings,
means for securing said plates and strip with said strip sandwiched between said plates and with said openings and teeth in alignment whereby said teeth extend freely into said openings for movement laterally of the plane of said plates, the free ends of said teeth being bent on themselves to form stop elements having detent surfaces, said stop elements protruding from the plane of said first plate in reset positions and from the plane of said second plate when flexed to set motion arresting positions,
and means depending from one of said plates into said openings and cooperable with said stop element detent surfaces to detentably hold said stop elements in set and reset positions.

References Cited by the Examiner

UNITED STATES PATENTS

| | | | |
|---|---|---|---|
| 731,386 | 6/1903 | Oliver | 197—178 |
| 907,119 | 12/1908 | Birgfeld | 197—70 X |
| 997,517 | 7/1911 | Steele | 197—177 |
| 1,017,301 | 2/1912 | Lockwood | 197—179 |
| 1,901,162 | 3/1933 | Helmond | 197—70 |
| 1,926,165 | 9/1933 | Myers et al. | 197—70 X |
| 2,212,692 | 8/1940 | Kitchens | 197—82 X |
| 3,018,870 | 1/1962 | Lambert et al. | 197—84.3 |
| 3,045,798 | 7/1962 | Lambert et al. | 197—84.3 |

ROBERT E. PULFREY, *Primary Examiner.*

E. WRIGHT, *Assistant Examiner.*